United States Patent [19]

Drath

[11] 3,909,414

[45] Sept. 30, 1975

[54] FILTER UNIT AND RETAINING PLUG CLOSURE

[76] Inventor: Edwin H. Drath, 1218 S. Patton, Arlington Heights, Ill. 60005

[22] Filed: Jan. 30, 1974

[21] Appl. No.: 437,904

[52] U.S. Cl. ............................. 210/232; 210/454
[51] Int. Cl.² ...................................... B01D 29/10
[58] Field of Search ............ 210/232, 453, 454, 455, 210/458, 499, 437, 448, 485, 497, 497.1; 55/486, 487, 500, 356; 285/32, 334, 355; 220/39 R; 138/89 F

[56] References Cited
UNITED STATES PATENTS

| | | | |
|---|---|---|---|
| 679,131 | 7/1901 | Thompson | 210/458 X |
| 1,455,136 | 5/1923 | Gentzel | 210/453 |
| 1,940,923 | 12/1933 | Stringer | 210/437 |
| 2,028,168 | 1/1936 | Roberts | 210/455 X |
| 2,211,892 | 8/1940 | Giese | 210/454 X |
| 2,379,848 | 7/1945 | Damme et al. | 210/453 X |
| 2,514,623 | 7/1950 | Brown | 55/487 X |
| 3,062,377 | 11/1962 | Havard et al. | 210/232 X |
| 3,325,036 | 6/1967 | Gasche et al. | 220/39 R |
| 3,335,923 | 8/1967 | Healy | 220/39 R |
| 3,363,771 | 1/1968 | Walters | 210/499 X |
| 3,393,824 | 7/1968 | Appleton | 220/39 R |
| 3,456,799 | 7/1969 | Musial | 210/448 |
| 3,659,402 | 5/1972 | Alliger | 55/487 X |
| 3,664,540 | 5/1972 | Witkin | 220/39 R |

FOREIGN PATENTS OR APPLICATIONS

| 8,545 | 1910 | United Kingdom | 210/455 |

*Primary Examiner*—Theodore A. Granger
*Attorney, Agent, or Firm*—Hill, Gross, Simpson, Van Santen, Steadman, Chiara & Simpson

[57] ABSTRACT

A filter unit includes a rigid generally cup-shaped housing providing a cylindrical chamber within which is coaxially mounted a plural layer coarse woven wire mesh generally cylindrical filter retainer intervening between a cylindrical filter screen and one or more outlets. The retainer and filter screen cylinders are seated at one end in the bottom of the filter housing chamber, and a closure on the opposite end of the housing includes a retaining plug which wedges into the adjacent ends of the retainer and filter screen cylinders and retains the screen against displacement. A simple and efficient seal between the closure plug and a screw-on cap prevents leakage from the unit, but permits a slight stuck-thread-releasing rocking of the cap relative to the housing, to facilitate unscrewing the cap.

6 Claims, 4 Drawing Figures

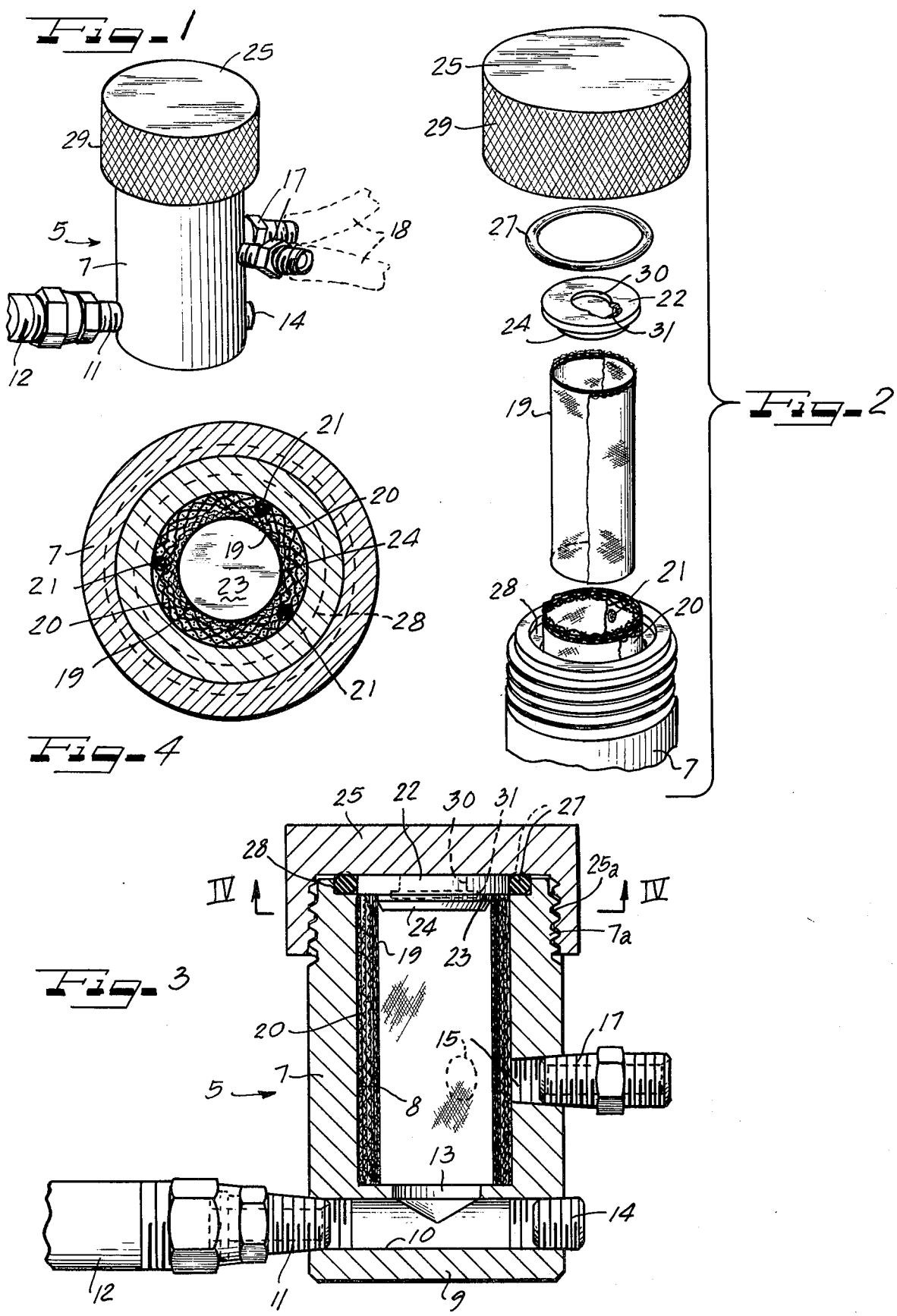

FILTER UNIT AND RETAINING PLUG CLOSURE

This invention relates to filters and is more particularly concerned with such filters especially useful in pressure material lines such as used in paint spraying apparatus.

Filters of the type used in pressure material line filters, and more particularly such filters used in the pressure lines leading to paint spray guns have heretofore employed filter screens of tubular wire mesh or tubular perforated metal wherein the filter has been constructed of a flat piece of material formed into cylindrical shape and with the abutting edges welded or soldered together to complete the cylinder. In order to provide for passage of filtered material such as paint from the filter screen to the outlet port or ports from the filter housing, opposite ends of the filter screen have been provided with spacer means such as annular radially projecting shoulders so that when the screen is inserted into the housing chamber the screen will remain in spaced relation to the wall of the chamber. A major disadvantage and problem encountered with such screens has been that when the screen becomes clogged there is a tendency to blow out at the weakest point such as the solder joint or weld joint, or at any other point where a weakness may be present in the screen. When that occurs, of course, the spray gun or other equipment intended to receive filtered material becomes clogged or befouled.

It is, accordingly, an important object of the present invention to overcome the foregoing and other disadvantages, deficiencies, inefficiencies, shortcomings and problems in prior filter structures for the purpose indicated, and to provide a new and improved construction as will hereinafter become apparent.

Another object of the invention is to provide a new and improved filter unit especially suitable for high pressure material lines such as for supplying paint spray guns.

A further object of the invention is to provide a new and improved filter structure of simple, efficient and economical construction.

Still another object of the invention is to provide a new and improved filter device especially suitable for high pressure material line uses and which is completely free from any blowout hazard.

A yet further object of the invention is to provide a new and improved retaining plug closure especially suitable for use with a high pressure material line filter.

Other objects, features and advantages of the invention will be readily apparent from the following description of a preferred embodiment thereof, taken in conjunction with the accompanying drawing although variations and modifications may be effected without departing from the spirit and scope of the novel concepts embodied in the disclosure, and in which:

FIG. 1 is a perspective view of a filter unit embodying features of the invention;

FIG. 2 is an exploded perspective view of elements of the filter unit;

FIG. 3 is a vertical sectional view through the filter unit; and

FIG. 4 is a sectional view taken substantially along the line IV—IV of FIG. 3.

A representative filter unit 5 embodying features of the invention comprises a rugged generally cup-shaped body housing 7 providing a cylindrical chamber 8 open at one end and integrally closed at the opposite end by bottom wall 9 provided with a transverse bore 10 opening at least through one end and into which is threaded a suitable nipple 11 to which a pressure material line 12 is detachably coupled in the customary manner to supply material such as paint to be filtered into the bore 10 from which a central entry port 13 communicates with the bottom of the chamber 8. Preferably the bore 10 extends all the way through to opposite sides of the housing 7 and may receive one of the line connecting nipples 11 to each end, or one end may be closed by a threaded plug 14 until that end is used for connection to supply. One or more, and in the present instance two delivery ports 15 open through the wall of the housing 7 and have respective nipples 17 secured therein for detachable coupling thereto of respective delivery hoses 18 leading to the point of use of the material which passes from the housing, such as to one or more paint spray guns.

For filtering the pressure material as it passes through the filter unit, a cylindrical filter screen 19 is mounted within the chamber 8 with its inner end seated on the end wall 9 about the port 13 and interposed between the port 13 and the delivery ports 15 so that material entering the chamber 8 through the supply port 13 must pass through the screen to reach the delivery ports 15. Although the screen 19 may, if preferred, by a single layer with adjoining edges soldered or welded to complete the screen, an economical, efficient and advantageous construction for the screen 19 comprises a coiled strip wound upon itself in a plurality of layers and normally self expansible so that it tends to unwind whereby the several layers tend to hug one another where the outer perimeter of the cylinder is retained against expansion. For example, the screen may comprise two full layers with the free ends on overlapping margins. The mesh size of the screen may be chosen to suit any particular usage, from for example 50 to 200 mesh for paint filtering depending on the type of paint being handled by the filter unit.

To maintain a spaced relation between the outer perimeter of the filter screen 19 and the cylindrical wall defining the chamber 8, a novel spacing retainer 20 is provided which comprises a cylindrically coiled coarse wire mesh. The mesh size for the retainer 20 is substantially larger than the coarsest screen mesh which may be used in the filter whereby free passage of filtered liquid from the screen 19 to the cylindrical wall of the chamber 8 is provided for, but with such thorough support provided for the screen 19 throughout its length as to preclude any blowout of the screen. An additional advantage of the coiled mesh retainer 20 resides in that its coarse mesh structure provides only minute point contact of one layer of the retainer with another layer and with the screen 19 and with the cylindrical wall of the chamber 8 so that a multitude of relatively free interconnected passages are provided throughout the retainer 20 for diffused but relatively free flow to the outlet or delivery ports 15. Because of the excellent diffusion of flow through the retainer 20, pile-up of filtrate in line with the ports 15 is minimized, and a fairly uniform distribution of filtrate throughout the inside of the screen 19 prevails in service. In a practical arrangement, the coarse mesh screen for the retainer 20 may comprise a single piece strip rolled into on the order of three layers or coils and with the coils tacked against spreading as by means of spots of solder 21 at suitable longitudinally spaced intervals therealong so that the retainer may be handled as a cylinder for installation slidably within the chamber 8, the outside diameter of the retainer cylinder being sized to fit snuggly within the cylinder.

For retaining the filter 19 and retainer 20 in assembly within the chamber 8, a retaining, wedging plug closure 22 is provided. This comprises a disk of a diameter about equal to the outside diameter of the retainer 20 and in assembly seated thereon with a cylindrical plug projection 23 extending down a short distance into the screen 19 which is coextensive in length with the retainer 20. To facilitate insertion of the plug projection 23 into the screen it is provided with a frustoconical lead-in taper 24. Through this arrangement, the plug 23 serves as an annular wedge within the end portion of the screen 19 to hold the coils of the screen spread apart and against any tendency to relax or unwind inwardly, as for example under fluid and filtrate pressure. In other words, the screen is at all times held firmly against the retainer 20.

Retention of the closure 22 in seated plugging relation to the screen 19 and the retainer 20 is by means of a sturdy cap 25 which is threadedly engaged onto the body housing 7 on and about and over the open end thereof and into thrusting engagement with the closure 22. To prevent leakage past the closure 22, an O-ring sealing member 27 is engaged about the disk perimeter of the closure 22 within a rabbet groove 28 provided therefore in the end of the housing 7 and of a depth about level with the adjacent outer ends of the screen 19 and the retainer 20 and of a width to receive the O-ring 27 fairly closely therein and in engagement with the disk perimeter of the closure 22 and with the diameter of the O-ring slightly greater than the depth of the groove 28 so that in initial assembly the top of the O-ring projects slightly above the adjacent end extremity of the housing 7. Through this arrangement the O-ring provides a centering medium for the closure 22. When the cap 25 is screwed down tight against the O-ring 27, the O-ring is caused to compress and thrust in tight sealing relation against all of the confining surfaces provided by the groove 28, the closure perimeter 22 and the cap 25. Because it is made of solid rubber the O-ring is flowable but relatively incompressible. By having the volume of the groove 28 confined about the perimeter of the closure 22 slightly less than the volume of the O-ring 27, the fully compressed O-ring will fill the groove sealingly but protrude above the top edge of the body 7 and hold the fully tightened cap 25 slightly spaced from the top edge, as shown in FIG. 3. This is desirable to permit slight canting, rocking of the cap 25 to facilitate unscrewing the same, by releasing threads stuck because of hardened or gummy material such as paint trapped in the threads. Rocking is provided for by a "sloppy" or loose fit between threads 7a on the body 7 engaged by threads 25a on the cap 25. The threads on one member conveniently the threads 25a on the cap 25, are oversize in pitch diameter relative to the mating threads 7a. As will be seen in FIG. 3, the threads 7a and 25a have their root diameters parallel so that although the threads are of differential root diameters all of the threads meet in cap-retaining line contact relation throughout their lengths. Hardened or gummy spillover or uncleaned material such as paint on or between the threads 7a and 25a tending to bind the threads can thus be defeated by rocking and torque forces applied manually by grasping the body 7 in one hand and the cap 25 in the other, causing the cap to rock on the O-ring 27 and the thread faces to separate and break the stuck material bonds.

It will thus be apparent that the present filter unit provides a durable, efficient, long-lived unit in which filter screen blowout is precluded. Maximum advantage of filtering area of the screen is attained with uniformity that provides maximum, near 100% capacity for the unit.

Cleanout of the filter unit 5 is exceedingly simple, involving merely removal of the cap 25 which, for ease in manipulation has a knurled outer rim surface 29. After removal of the cap 25, the retainer 22 is lifted out to release and expose the screen 19 which can then be removed and cleaned. Since the retainer screen 20 is press-fitted into the chamber 8, it will resist longitudinal displacement when the screen 19 is pulled from the unit, even if the screen has a tendency to stick thereto. If desired, of course, the retainer screen 20 may be removed also for cleaning, but ordinarily merely soaking the interior of the unit in a solvent will serve the purpose. Should the generally disk shaped retainer 22 have a tendency to stick when it is desired to remove the same, a suitable pry-off tool such as a screwdriver may be inserted into a central head depression 30 therein with the tip of the tool extended under a pry-off shoulder 31 in the bottom of the recess, and leverage force applied to displace the retainer member 22.

It will be understood that variations and modifications may be effected without departing from the spirit and scope of the novel concepts of this invention.

I claim as my invention:

1. A filter unit especially suitable for pressure material lines, comprising:

a rigid generally cup-shaped housing providing a cylindrical chamber open at one end, having a supply port opening through the central portion of a bottom wall in the chamber and at least one delivery port opening through a portion of the cylindrical wall of the chamber;

a generally cylindrical filter screen within said chamber having one end seated about said supply port and its opposite end adjacent to the open end of the chamber;

a generally cylindrical coarse mesh retainer interposed between said screen and the cylindrical wall of the chamber and also seated about said delivery port and providing a firm support against blowout for the screen and multiple connected passages from about the screen leading to the delivery port;

means closing the chamber and including a disk member dimensioned to engage against the outer end of the retainer screen and having a wedging inward projection against the outer end portion of the filter screen;

an annular groove in the housing adjacent to its open end and about the perimeter of the closure disk;

a centering and sealing O-ring in said groove engaging the perimeter of the disk and normally projecting above the crown of the disk; and a closure cap removably secured on the housing over said open end and compressing the O-ring into sealing engagement with surfaces confining the O-ring in said groove.

2. A filter unit according to claim 1, including coactive threads on said housing and on said closure cap and of differential size so as normally to provide a loose fit, said O-ring in the compressed condition maintaining the closure cap spaced from the open end of the housing, whereby on applying torque and canting force for unscrewing the cap the binding effect of material trapped between the threads will be broken to release the cap.

3. A filter unit especially suitable for pressure material lines, comprising:

a rigid generally cup-shaped housing providing a cylindrical chamber open at one end, having a supply port opening through the central portion of a bottom wall in the chamber and at least one delivery port opening through a portion of the cylindrical wall of the chamber;

a generally cylindrical filter screen within said chamber having one end seated about said supply port and its opposite end adjacent to the open end of the chamber;

a generally cylindrical coarse mesh retainer interposed between said screen and the cylindrical wall of the chamber and also seated about said delivery port and providing a firm support against blowout for the screen and multiple connected passages from about the screen leading to the delivery port;

said retainer engaging along its entire outer periphery snugly with said wall of the chamber, and said multiple connected passages providing the entire communication between said screen and said delivery port;

means closing the open end of the chamber and including a closure disk dimensioned to engage against the outer end of the retainer screen and having a wedging inward projection against the outer end portion of the filter screen; and a closure cap threadedly secured onto said housing and thrusting against said closure disk.

4. A filter unit according to claim 3, wherein said retainer screen fits so firmly within the cylindrical wall of the chamber that it normally resists longitudinal displacement, and the filter screen is readily removable longitudinally relative to the retainer screen for cleaning.

5. A filter unit according to claim 3, wherein said wedging projection includes a generally cylindrical portion extending from the closure disk and a tapered leading end portion to facilitate wedging reception of the projection in the filter screen end portion.

6. A filter unit especially suitable for pressure material lines, comprising:

a rigid generally cup-shaped housing providing a cylindrical chamber open at one end, having a supply port opening through the central portion of a bottom wall in the chamber and at least one delivery port opening through a portion of the cylindrical wall of the chamber;

a generally cylindrical filter screen within said chamber having one end seated about said supply port and its opposite end adjacent to the open end of the chamber;

a generally cylindrical coarse mesh retainer interposed between said screen and the cylindrical wall of the chamber and also seated about said delivery port and providing a firm support against blowout for the screen and multiple connected passages from about the screen leading to the delivery port;

means closing the open end of the chamber and including a closure disk dimensioned to engage against the outer end of the retainer screen and having a wedging inward projection against the outer end portion of the filter screen; and said closure disk having a blind end crown pry-off recess opening outwardly therein and provided with a pry-off shoulder engageable by means of a pry-off tool for removing the closure disk from the unit when desired.

* * * * *